United States Patent
Samar et al.

(10) Patent No.: US 6,516,317 B1
(45) Date of Patent: Feb. 4, 2003

(54) METHOD AND APPARATUS FOR FACILITATING COMPARTMENTALIZED DATABASE USER MANAGEMENT

(75) Inventors: Vipin Samar, Cupertino, CA (US); Chon Hei Lei, Alameda, CA (US); Thomas F. Keefe, San Mateo, CA (US)

(73) Assignee: Oracle Corporation, Redwood Shores, CA (US)

( * ) Notice: Subject to any disclaimer, the term of this patent is extended or adjusted under 35 U.S.C. 154(b) by 232 days.

(21) Appl. No.: 09/748,026

(22) Filed: Dec. 21, 2000

(51) Int. Cl.[7] ............................................... G06F 17/30
(52) U.S. Cl. ............................................................ 707/9
(58) Field of Search ............................... 707/9, 10, 102

(56) References Cited

U.S. PATENT DOCUMENTS

| | | | | |
|---|---|---|---|---|
| 4,688,195 A | * | 8/1987 | Thompson et al. | 706/11 |
| 5,568,605 A | * | 10/1996 | Clouston et al. | 709/249 |
| 5,689,566 A | * | 11/1997 | Nguyen | 380/29 |
| 5,806,074 A | * | 9/1998 | Souder et al. | 707/203 |
| 5,864,683 A | * | 1/1999 | Boebert et al. | 705/10 |
| 6,026,402 A | * | 2/2000 | Vossen et al. | 707/10 |
| 6,067,623 A | * | 5/2000 | Blakley et al. | 707/9 |
| 6,272,491 B1 | * | 8/2001 | Chan et al. | 380/28 |
| 6,336,114 B1 | * | 1/2002 | Garrison | 707/10 |
| 6,360,228 B1 | * | 3/2002 | Sundara et al. | 707/100 |
| 6,370,573 B1 | * | 4/2002 | Bowman-Amuah | 709/223 |

* cited by examiner

*Primary Examiner*—Safet Metjahic
*Assistant Examiner*—Sana Al-hashemi
(74) *Attorney, Agent, or Firm*—Park, Vaughan & Fleming LLP

(57) ABSTRACT

One embodiment of the present invention provides a system that facilitates compartmentalized user management in a database system. This database system is compartmentalized into a plurality of domains that are insulated from each other, so that a given user who has access to data within an associated domain does not have access to data in other domains. Upon receiving a request from a database administrator to perform an operation on a user within the database system, the system identifies a domain that the user is associated with in the database system. Next, the system determines whether the database administrator is authorized to modify users associated with the domain. If so, the system performs the operation by modifying an entry for the user within a user table in the database system that contains an entry for each user of the database system. In one embodiment of the present invention, the operation on the user can include: creating the user within the database system; altering the domain that the user is associated with in the database system; and dropping the user from the database system.

27 Claims, 8 Drawing Sheets

DOMAIN TABLE 122

| DOMAIN NAME | ID | PARENT ID |
|---|---|---|
|  |  |  |
|  |  |  |
|  |  |  |
|  |  |  |
|  |  |  |

USER TABLE 124

| USER NAME | DOMAIN ID |
|---|---|
|  |  |
|  |  |
|  |  |
|  |  |
|  |  |

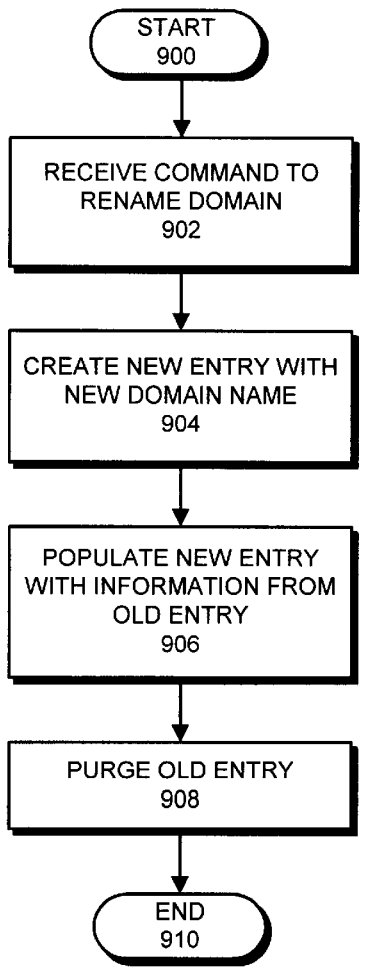
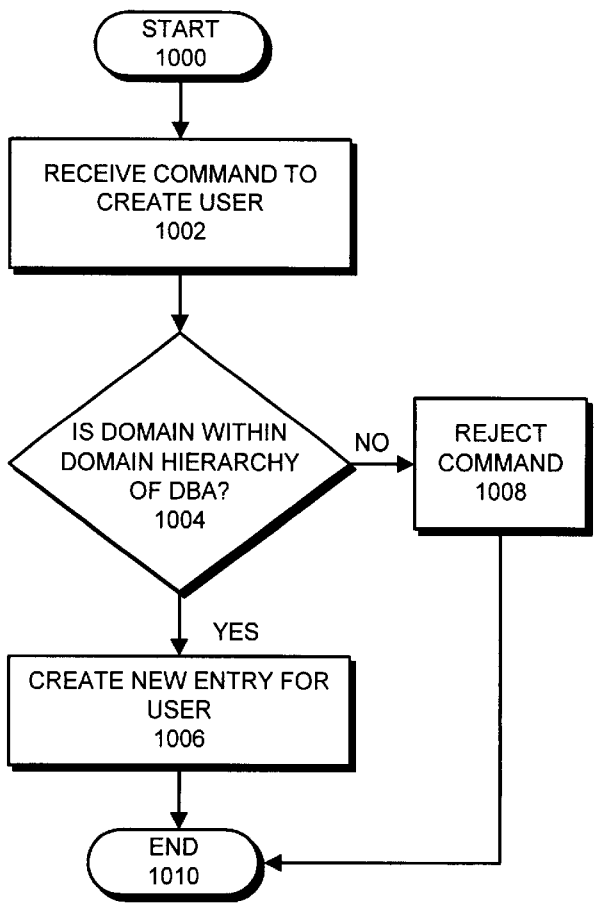
FIG. 9
FIG. 10

METHOD AND APPARATUS FOR FACILITATING COMPARTMENTALIZED DATABASE USER MANAGEMENT

BACKGROUND

1. Field of the Invention

The present invention relates to the management of database systems. More specifically, the present invention relates to a method and an apparatus for facilitating delegated and compartmentalized database user management.

2. Related Art

Application service providers (ASPs) are commonly used to support numerous applications for multiple enterprises, partners and end users. Within an ASP, multiple databases are often combined into a single database instance in order to consolidate information and to save costs. However, this consolidation can create problems, because users belonging to one enterprise can potentially access information belonging to another enterprise that is contained within the same consolidated database. Hence, a consolidated database must be carefully designed to ensure that users of a first application belonging to a first enterprise do not have access to data belonging to a second enterprise.

Within an ASP computer system, it is also advantageous to delegate the management of users to respective organizational administrators, instead of relying on system administrators of the ASP to manage users. This allows an organization administrator to enforce specific policies for the organization. However, delegating management responsibilities also introduces potential problems because system administrators from a first organization can potentially manipulate users or data belonging to a second organization.

Hence, an ASP computer system must be carefully designed to ensure that system administrators belonging to a first organization cannot affect users belonging to a second organization. Designing an ASP computer system with the necessary protections can be challenging if the underlying database system is a table-based relational database system, as opposed to a hierarchical database system. This is because information from different organizations may be stored within a flat namespace in the same relational table.

What is needed is a method and an apparatus for facilitating delegated and compartmentalized management of users within a consolidated database system that supports multiple compartmentalized applications belonging to multiple organizations.

SUMMARY

One embodiment of the present invention provides a system that facilitates compartmentalized user management in a database system. This database system is compartmentalized into a plurality of domains that are insulated from each other, so that a given user who has access to data within an associated domain does not have access to data in other domains. Upon receiving a request from a database administrator to perform an operation on a user within the database system, the system identifies a domain that the user is associated with in the database system. Next, the system determines whether the database administrator is authorized to modify users associated with the domain. If so, the system performs the operation by modifying an entry for the user within a user table in the database system that contains an entry for each user of the database system.

In one embodiment of the present invention, the operation on the user can include: creating the user within the database system; altering the domain that the user is associated with in the database system; and dropping the user from the database system.

In one embodiment of the present invention, the system disallows the operation if the database administrator is not authorized to modify users of the domain.

In one embodiment of the present invention, the plurality of domains in the database system are organized into a hierarchy in which each domain can have multiple direct descendents and at most one direct ancestor. In this embodiment, each database administrator for the database system is associated with a given domain in the hierarchy and is authorized to modify users associated with the given domain, as well as users associated with domains that are descendents of the given domain.

In one embodiment of the present invention, each database administrator for the database system is authorized to modify the database administrator's associated domain, as well as domains that are descendents of the associated domain within the hierarchy.

In one embodiment of the present invention, the system receives a request from the database administrator to perform an operation on a target domain within the database system. In response to this request, the system determines whether the database administrator is authorized to modify the target domain. If so, the system performs the operation by modifying an entry for the target domain within a domain table in the database system that includes an entry for each domain defined within the database system.

In one embodiment of the present invention, the operation on the domain can include: creating the domain within the database system; moving the domain to be under a different parent domain within the database system; dropping the domain from the database system; and renaming the domain.

In one embodiment of the present invention, each entry in the domain table includes a domain identifier, and an identifier for a parent domain.

In one embodiment of the present invention, identifying the domain that the user is associated with involves looking up an identifier for the domain in the entry for the user in the user table, if the entry exists. If the entry does not exist, identifying the domain involves receiving the identifier for the domain as part of the request to perform the operation.

BRIEF DESCRIPTION OF THE FIGURES

FIG. 9 is a flow chart illustrating the process of renaming a domain in accordance with an embodiment of the present invention.

FIG. 10 is a flow chart illustrating the process of creating an entry for a user in a database system in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
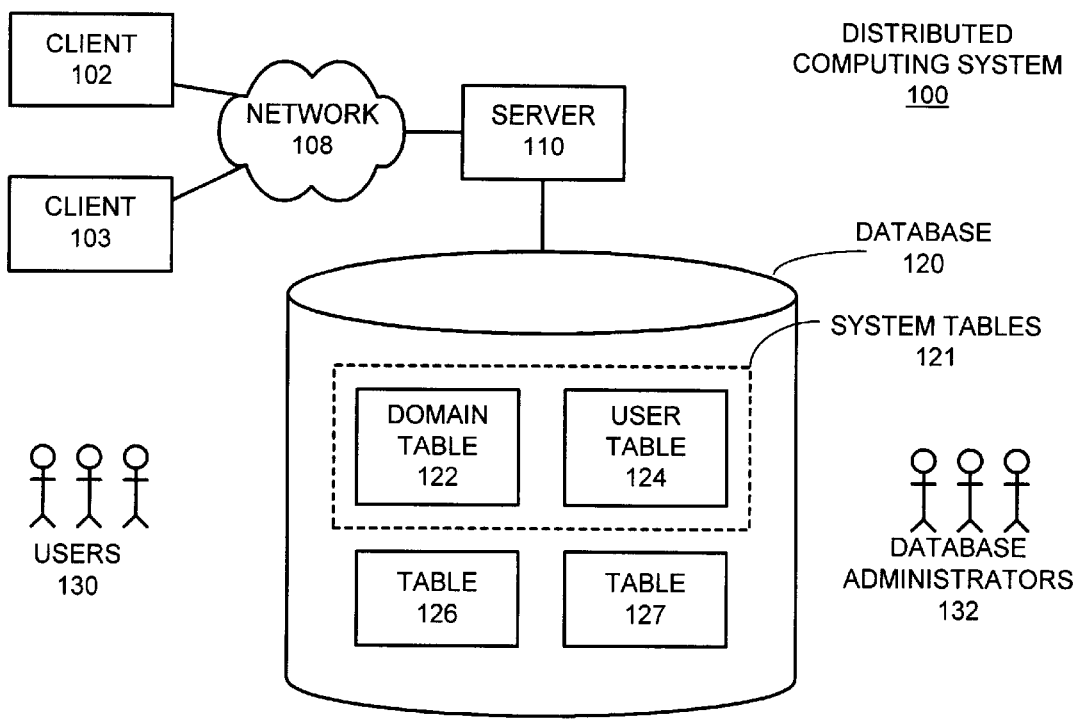
FIG. 1 illustrates a distributed computing system in accordance with an embodiment of the present invention.

FIG. 1 illustrates a distributed computing system 100 in accordance with an embodiment of the present invention. Distributed computing system 100 includes clients 102–103, which are coupled to server 110 through network 108.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Clients 102–103 can generally include any node on network 108 including computational capability and including a mechanism for communicating across network 108 to server 110. More specifically, clients 102–103 can execute user applications that make requests to server 110, which accesses database 120. These applications include applications executed on behalf of users 130. Moreover, clients 102–103 can be operated by system administrators, such as database administrators 132. Database administrators 132 issue commands from clients 102–103 to perform system administration functions on database 120 as is described in more detail below with reference to FIGS. 2–12. These system administration functions can generally include any database administration functions, such as adding a new user, restoring an older version of a table, or looking up a forgotten password.

Server 110 can generally include any computational node including a mechanism for servicing requests from a client for computational and/or data storage resources. More specifically, server 110 is a database server that facilitates accesses to database 120 by clients 102–103.

Server 110 is attached to database 120. Database 120 can include any type of system for storing data in non-volatile (and possibly volatile) storage. This includes, but is not limited to, systems based upon magnetic, optical, and magneto-optical storage devices, as well as storage devices based on flash memory and/or battery-backed up memory.

Database 120 includes tables 126–127 containing data that can be accessed by users 130. More specifically, tables 126–127 contain data that can be accessed by any users of database 120, provided that the users have access rights to tables 126–127.

Database 120 also includes a domain table 122, which keeps track of different "domains" that are supported by database 120. Note that a given system administrator for a first domain is able to manage users associated with the first domain, but is not able to manage users associated with other domains, unless they are descendants of the former. This allows system administration functions to be delegated to system administrators from an organization associated with the domain, without allowing the system administrators to affect other domains belonging to other organizations.

Database 120 also includes user table 124, which keeps track of users 130 of database 120. Note that user table 124 is structured so that a given system administrator belonging to a first domain is only able to access entries in user table 124 for users belonging to the first domain, without being able to access other entries in user table 124 associated with users from other domains.

Note that although the present invention is described in the context of a distributed computing system, the present invention can generally be applied to any computing system that includes a database, and is not meant to be limited to distributed computing system.

Domains

Figure 2:
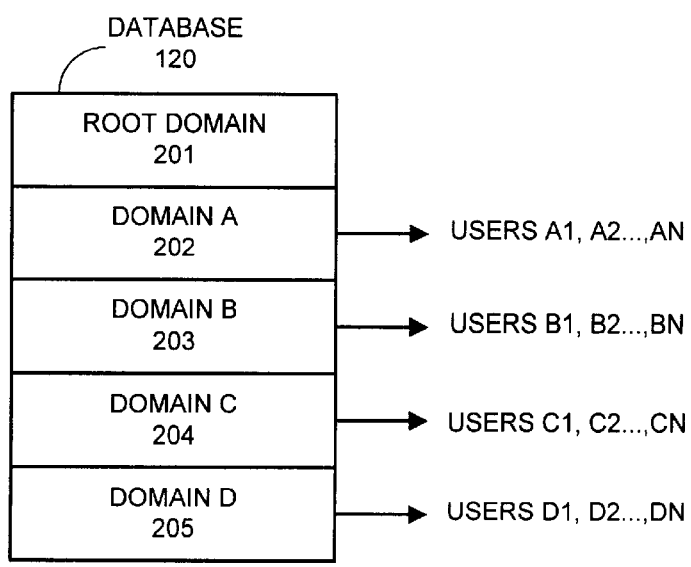
FIG. 2 illustrates how a database is partitioned into domains in accordance with an embodiment of the present invention.

FIG. 2 illustrates how database 120 is partitioned into domains 201–205 in accordance with an embodiment of the present invention. Note that each one of users 130 within database 120 is associated with at most one of domains 201–205. Moreover, each of the domains 202–205 is associated with a different set of users. More specifically, domain A 202 is associated with users A1, A2, . . . , AN; domain B 203 is associated with users B1, B2, . . . , BN; domain C 204 is associated with users C1, C2, . . . , CN; and domain D 205 is associated with users D1, D2, . . . , DN.

Hierarchy of Domains

Figures 3, 4, 5:
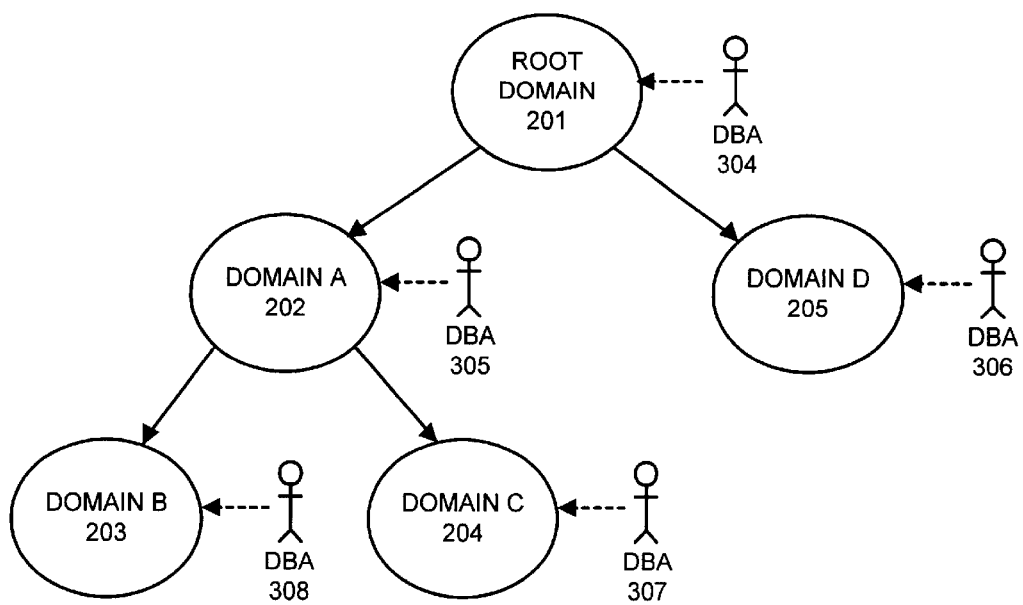
FIG. 3 illustrates a hierarchy of domains in accordance with an embodiment of the present invention.
FIG. 4 illustrates a domain table in accordance with an embodiment of the present invention.
FIG. 5 illustrates a user table in accordance with an embodiment of the present invention.

FIG. 3 illustrates a hierarchy of domains in accordance with an embodiment of the present invention. Within this hierarchy, root domain 201 is the topmost domain and is associated with database administrator (DBA) 304. Note that DBA 304 is authorized to perform operations on objects, such as users or domains, within root domain 201 and within any of the subordinate domains 202–205.

Immediately below root domain 201 are domain A 202 and domain D 205. Domain A 202 is associated with DBA 305, who is authorized to perform operations on objects within domain A 202, and within any of the subordinate domains 203–204. Domain D 205 is associated with DBA 306, who is authorized to perform operations on objects within domain D 205.

Immediately below domain A 202 are domain B 203 and domain C 204. Domain B 203 is associated with DBA 308, who is authorized to perform operations on objects within domain B 203. Domain C 204 is associated with DBA 308, who is authorized to perform operations on objects within domain C 204.

Domain Table

FIG. 4 illustrates domain table 122 in accordance with an embodiment of the present invention. Each row within domain table 122 contains information for a given domain. More specifically, each row includes a domain name, a numerical domain identifier, and a numerical identifier for a parent domain. Note that a given system administrator is only able to access entries for domains that are under the given system administrator in the domain hierarchy.

User Table

FIG. 5 illustrates user table 124 in accordance with an embodiment of the present invention. Each row within user table 124 contains information for a given user. More specifically, each entry includes a user name, as well as a numerical identifier for an associated domain. Note that a given system administrator is only able to access entries for users that belong to a domain that is under control of the given system administrator. This can be accomplished by using known techniques for implementing virtual private databases (or row-level access control) to restrict accesses by a given system administrator to a set of entries within user table 124 that the given system administrator is authorized to access. Virtual private databases are described in more detail in a pending U.S. patent application entitled, "Database Fine-Grained Access Control, Ser. No. 09/167,092, filed Oct. 5, 1998, by inventors Chon Lei and Douglas J. McMahon. This application is hereby incorporated by reference to disclose how such virtual private databases operate.

Process of Creating a Domain

Figure 6:
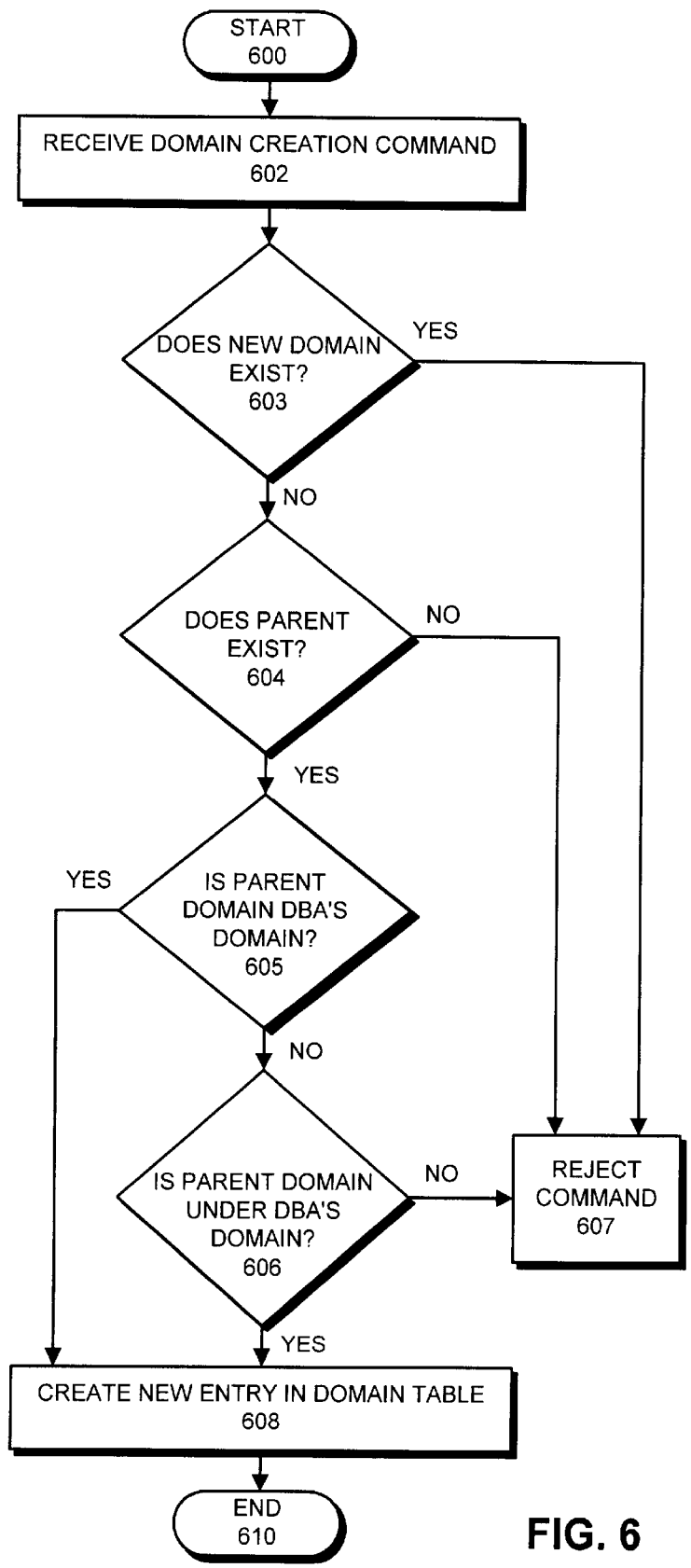
FIG. 6 is a flow chart illustrating the process of creating a domain in accordance with an embodiment of the present invention.

FIG. 6 is a flow chart illustrating the process of creating a new domain in accordance with an embodiment of the present invention. The system starts by receiving a domain creation command from a DBA (step 602). This command specifies both a new domain and a parent domain. If a parent domain is not specified, the parent domain is the DBA's domain.

Next, the system determines if the new domain already exists by looking up the new domain in domain table 122 (step 603). If so, the system rejects the domain creation command (step 607). Otherwise, the system determines whether the new domain's parent exists (step 604). If not, the system rejects the domain creation command (step 607).

If the new domain's parent does exist, the system determines whether the new domain's parent is the DBA's domain (step 605). If so, the system creates a new entry in domain table 122 for the new domain (step 608). This may involve first locking the row of the parent domain to prevent the parent's domain from being dropped during the operation.

Otherwise, if the new domain's parent is not the DBA's domain, the system determines whether parent domain is located somewhere under the DBA's domain (step 606). If so, the system creates a new entry in domain table (step 608). Otherwise the system rejects the domain creation command (step 607).

Process of Dropping a Domain

Figure 7:
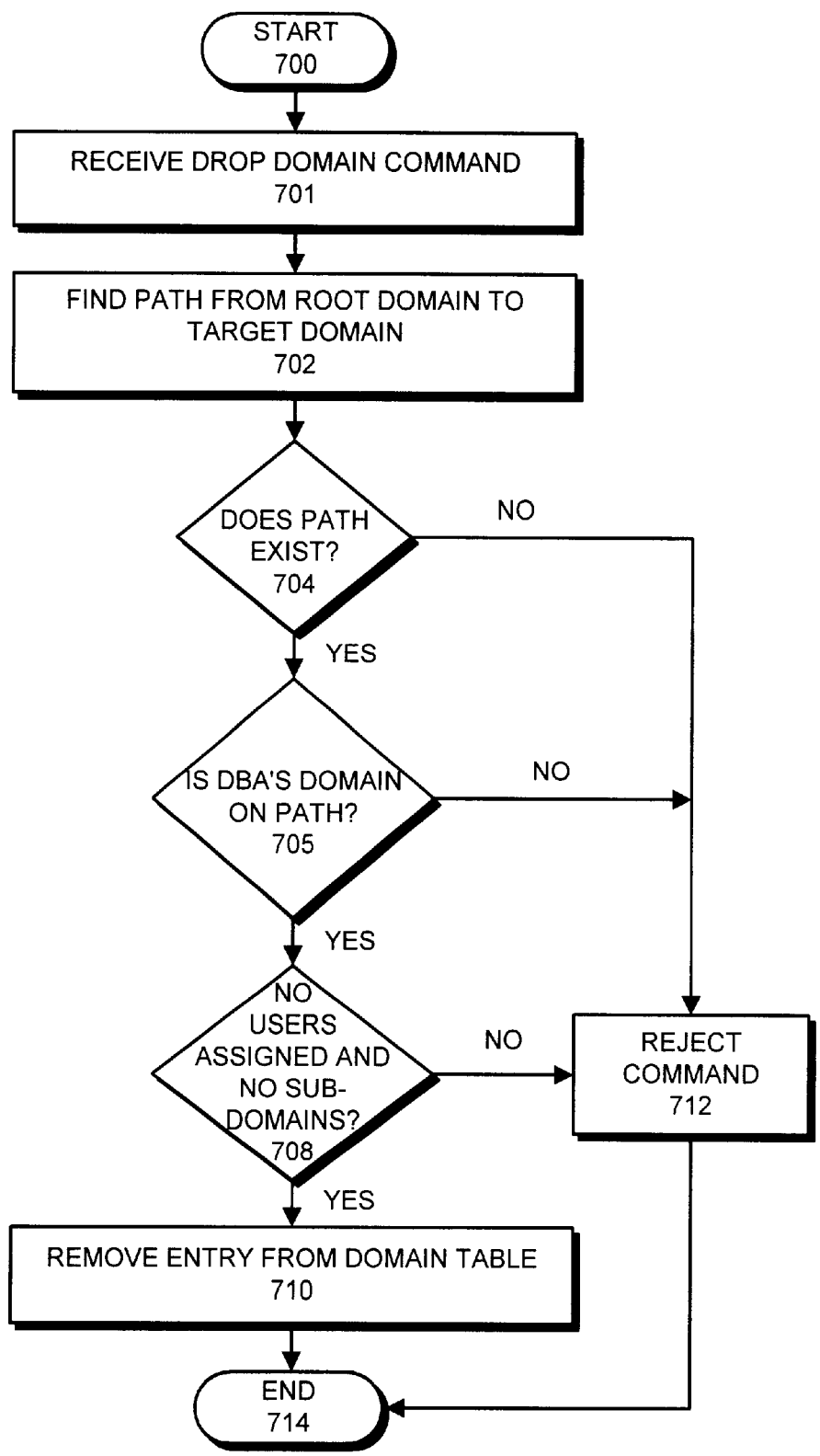
FIG. 7 is a flow chart illustrating the process of dropping a domain in accordance with an embodiment of the present invention.

FIG. 7 is a flow chart illustrating the process of dropping a domain in accordance with an embodiment of the present invention. The system starts by receiving a drop domain command from a DBA (step 701). This command specifies a target domain to be dropped. Next, the system attempts to find a path from the root domain to the target domain (step 702). The system next determines if the path exists (step 704). If so, the system determines if the DBA's domain is on the path from the root domain to the target domain (step 705). If so, the DBA has the power to remove the domain. In this case, the system checks to see if the target domain has no users assigned and has no subdomains (step 708). If so, the system removes the entry for the target domain from domain table 122 (step 710). Otherwise, if the path does not exist in step 704, if the DBA's domain is not on the path in step 705, or if the target domain is not empty in step 708, the system rejects the command (step 712).

Note that the system can also lock each domain on the path from the root domain to the target domain during the operation to ensure that the path remains intact during the operation. It also ensures that the target domain does not get assigned to another parent domain.

Process of Altering a Domain

Figure 8:
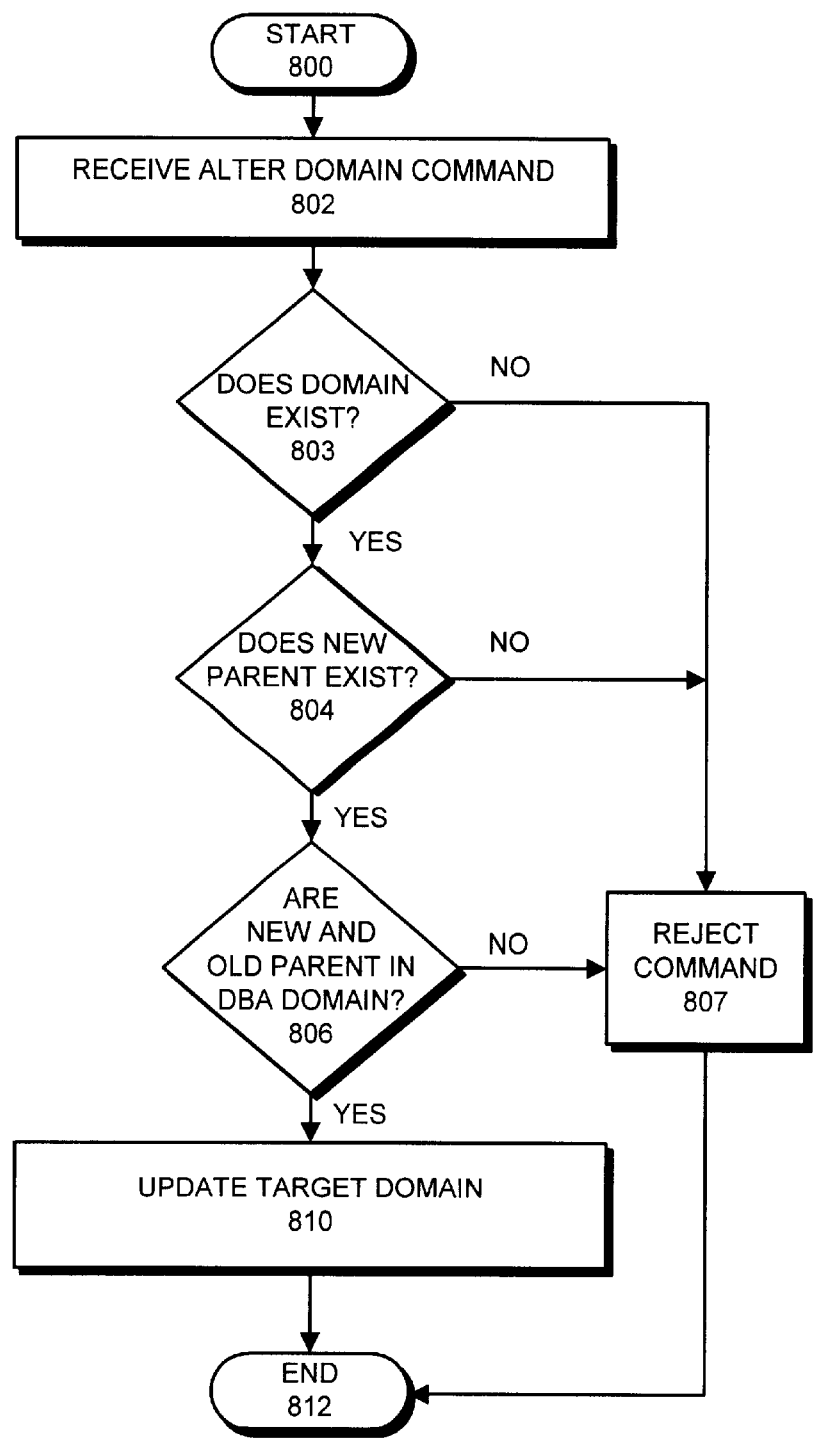
FIG. 8 is a flow chart illustrating the process of altering a domain in accordance with an embodiment of the present invention.

FIG. 8 is a flow chart illustrating the process of altering a domain in accordance with an embodiment of the present invention. This is similar to the drop domain command. The system first receives the alter domain command from the DBA to change the parent of a target domain to a new parent domain (step 802). Next, the system determines whether the target domain exists (step 803). If so, the system determines whether the new parent exists (step 804). If so, the system determines if the new and old parents are under the DBA's domain (step 806). If so, the DBA is authorized to move the target domain to the new parent. The system then updates the entry for the target domain in domain table 122 to indicate the new parent domain (step 810).

Otherwise, if at step 803 the target domain does not exist, if at step 804 the new parent does not exist, or if at step 806 the new parent is not under the DBA's domain, the system rejects the command (step 807).

Process of Renaming a Domain

FIG. 9 is a flow chart illustrating the process of renaming a domain in accordance with an embodiment of the present invention. The system first receives a command from a DBA to rename a target domain (step 902). Next, the system creates a new entry in domain table 122 with the new domain name (step 904). The system then populates the new entry with information from the old entry for the target domain (step 906). Finally, the system purges the old entry from domain table 122 (step 908).

Process of Creating a User

FIG. 10 is a flow chart illustrating the process of creating an entry for a user in a database system in accordance with an embodiment of the present invention. The system starts by receiving a command to create a new user from a DBA (step 1002). If the command specifies a domain for the new user, the system determines if the specified domain is under the domain of the DBA, which means that the DBA is authorized to create the new user within the domain (step 1004). If not, the system rejects the command (step 1008). Otherwise, the system creates a new entry within user table 124 for the new user (step 1010).

If the command does not specify a domain for the new user, the DBA's domain is used as a default domain in creating a new entry within user table 124 for the new user (step 1010).

Note that the domain for the new user can be locked during the operation so that the domain cannot be removed during the operation.

Process of Altering a User

Figure 11:
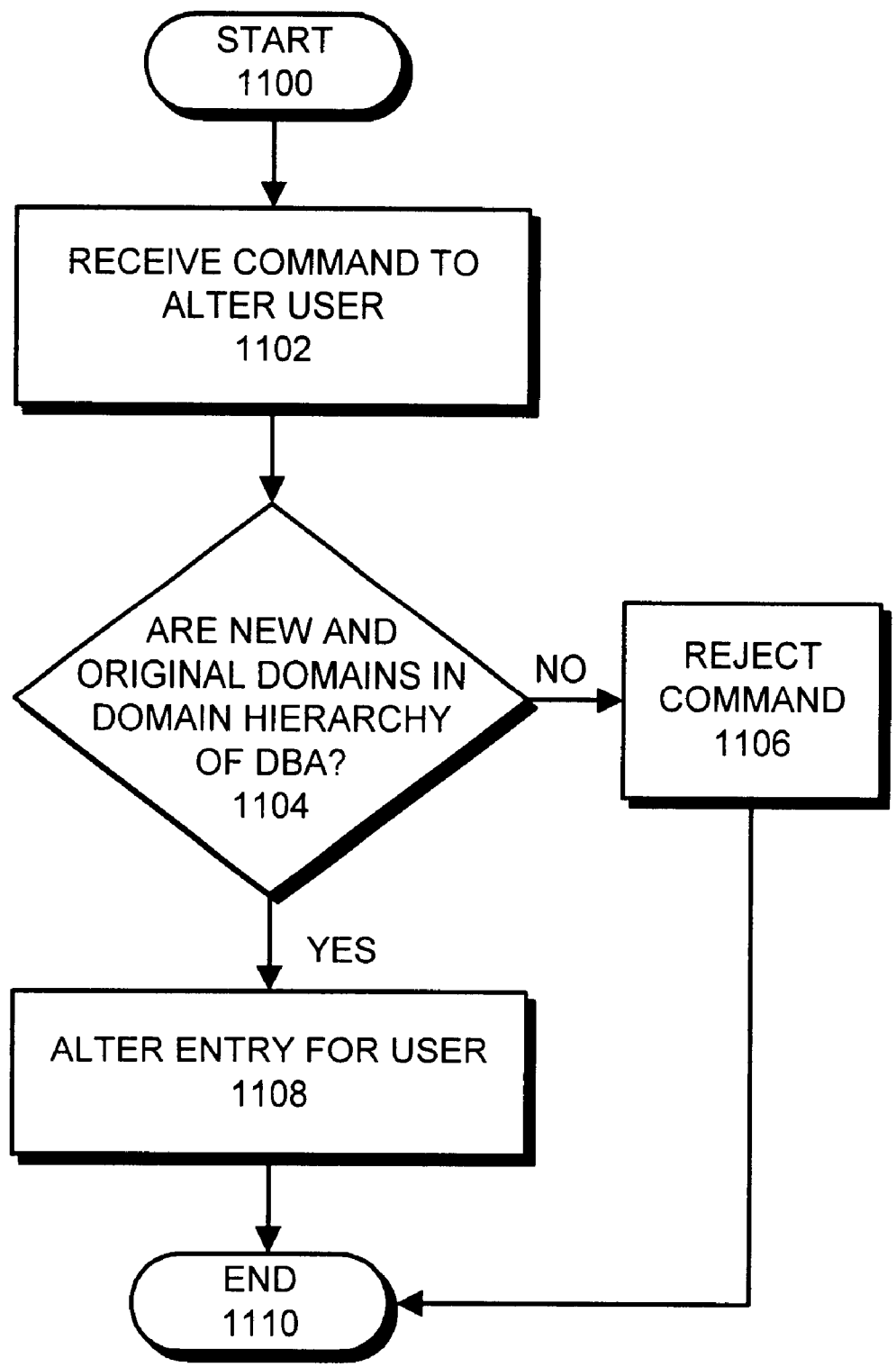
FIG. 11 is a flow chart illustrating the process of altering an entry for a user in a database system in accordance with an embodiment of the present invention.

FIG. 11 is a flow chart illustrating the process of altering an entry for a user in a database system in accordance with an embodiment of the present invention. The system starts by receiving a command from a DBA to alter a target user to be under a new domain (step 1102). Next, the system determines if both the new domain and the original domain are under the domain of the DBA, which means that the DBA is authorized to move the target user to the new domain (step 1104). If not, the system rejects the command (step 1106). Otherwise, the system alters the entry for the target user within user table 124 to include the new domain (step 1108).

Note that the new domain for the target user can be locked during the operation so that the new domain cannot be removed during the operation.

Process of Dropping a User

Figure 12:
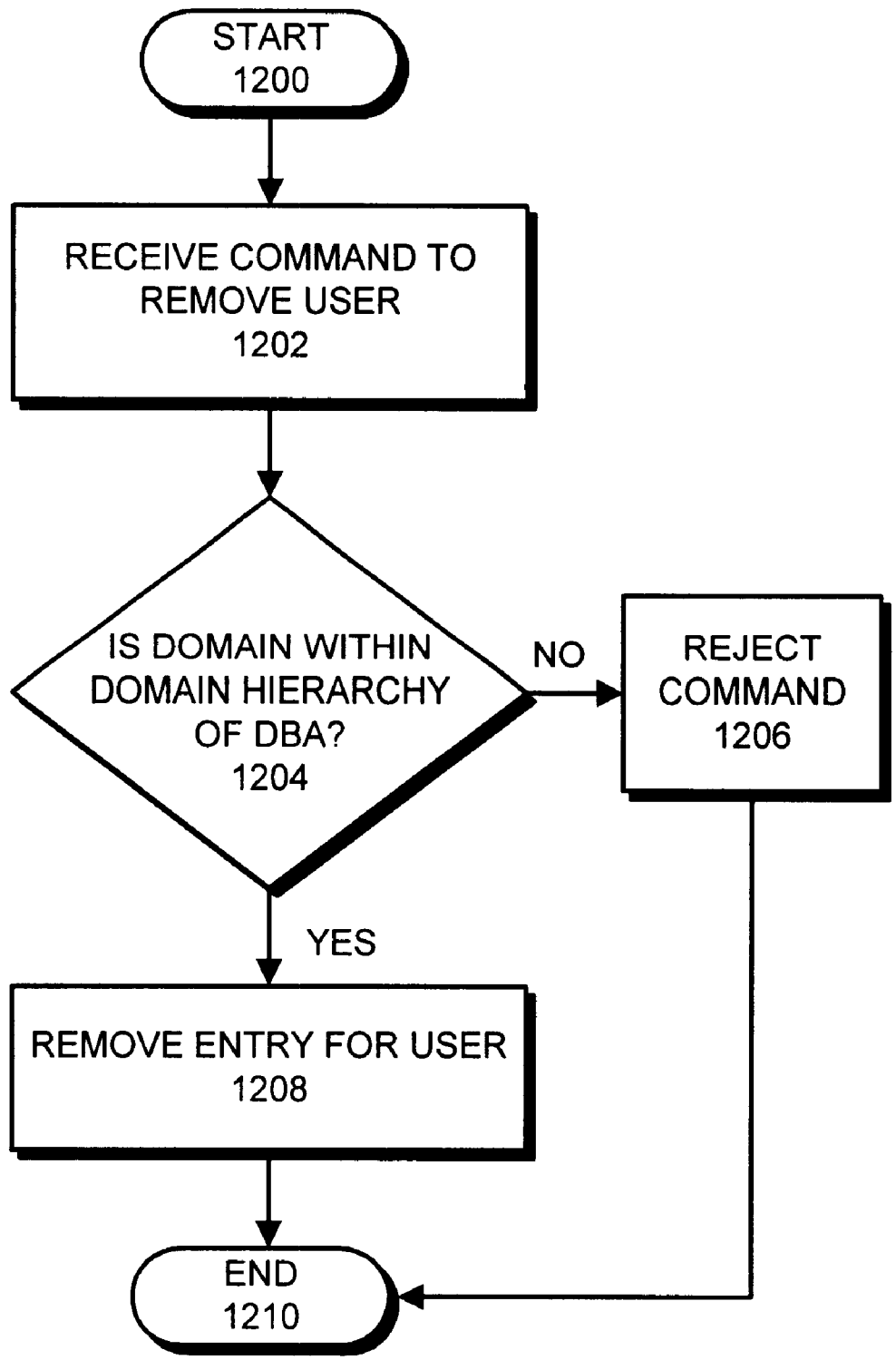
FIG. 12 is a flow chart illustrating the process of removing an entry for a user in a database system in accordance with an embodiment of the present invention.

FIG. 12 is a flow chart illustrating the process of removing an entry for a user in a database system in accordance with an embodiment of the present invention. The system starts by receiving a command from a DBA to remove a target user from a domain (step 1202). Next, the system determines if the target domain is under the domain of the DBA, which means that the DBA is authorized to remove the target user from the target domain (step 1204). If not, the system rejects the command (step 1206). Otherwise, the system alters the entry for the target user within user table 124 to include the new domain (step 1208).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating compartmentalized user management in a database system, wherein the database system is compartmentalized into a plurality of domains that are insulated from each other, so that a given user that has access to data within an associated domain does not have access to data in other domains, the method comprising:
   receiving a request from a database administrator to perform an operation on a user identifier within the database system,
   identifying a domain that the user identifier is associated with in the database system;
   determining whether the database administrator is authorized to modify user identifiers associated with the domain;
   if the database administrator is authorized to modify the user identifiers associated with the domain, performing the operation by modifying an entry the user identifier within a user table in the database system, wherein the user table includes an entry for each user identifier defined within the database system.

2. The method of claim 1, wherein the operation on the user identifier includes one of:
   creating the user identifier within the database system;
   changing the domain that the user identifier is associated with in the database system;
   dropping the user identifier from the database system;
   renaming the user identifier; and
   changing any other properties attached to the user identifier.

3. The method of claim 1, wherein if the database administrator is not authorized to modify user identifiers associated with the domain, the method further comprises disallowing the operation.

4. The method of claim 1,
   wherein the plurality of domains in the database system are organized into a hierarchy in which each domain can have multiple direct descendents and at most one direct ancestor;
   wherein each database administrator for the database system is associated with a given domain in the hierarchy and is authorized to modify user identifiers associated with the given domain, as well as user identifiers associated with domains that are descendents of the given domain.

5. The method of claim 4, wherein each database administrator for the database system is authorized to modify the database administrator's associated given domain, as well as domains that are descendents of the given domain within the hierarchy.

6. The method of claim 5, further comprising:
   receiving a request from the database administrator to perform an operation on a target domain within the database system;
   determining whether the database administrator is authorized to modify the target domain;
   if the database administrator is authorized to modify the target domain, performing the operation by modifying an entry for the target domain within a domain table in the database system that includes an entry for each domain defined within the database system.

7. The method of claim 6, wherein the operation on the target domain includes one of:
   creating the domain within the database system;
   moving the domain to be under a different parent domain within the database system;
   dropping the domain from the database system; and
   renaming the domain.

8. The method of claim 6, wherein each entry in the domain table includes:
   a domain identifier; and
   an identifier for a parent domain.

9. The method of claim 1, wherein identifying the domain that the user identifier is associated with involves:
   looking up an identifier for the domain in the entry for the user identifier in the user table, if the entry exists; and
   if the entry does not exist, receiving the identifier for the domain as part of the request to perform the operation.

10. A computer-readable storage medium storing instructions that when executed by a computer cause the computer to perform a method for facilitating compartmentalized user management in a database system, wherein the database system is compartmentalized into a plurality of domains that are insulated from each other, so that a given user that has access to data within an associated domain does not have access to data in other domains, the method comprising:
    receiving a request from a database administrator to perform an operation on a user identifier within the database system,
    identifying a domain that the user identifier is associated with in the database system;
    determining whether the database administrator is authorized to modify user identifiers associated with the domain;
    if the database administrator is authorized to modify the user identifiers associated with the domain, performing the operation by modifying an entry the user identifier within a user table in the database system, wherein the user table includes an entry for each user identifier defined within the database system.

11. The computer-readable storage medium of claim 10, wherein the operation on the user identifier includes one of:

creating the user identifier within the database system;

changing the domain that the user identifier is associated with in the database system;

dropping the user identifier from the database system;

renaming the user identifier; and changing any other properties attached to the user identifier.

12. The computer-readable storage medium of claim 10, wherein if the database administrator is not authorized to modify user identifiers associated with the domain, the method further comprises disallowing the operation.

13. The computer-readable storage medium of claim 10,
wherein the plurality of domains in the database system are organized into a hierarchy in which each domain can have multiple direct descendents and at most one direct ancestor;

wherein each database administrator for the database system is associated with a given domain in the hierarchy and is authorized to modify user identifiers associated with the given domain, as well as user identifiers associated with domains that are descendents of the given domain.

14. The computer-readable storage medium of claim 13, wherein each database administrator for the database system is authorized to modify the database administrator's associated given domain, as well as domains that are descendents of the given domain within the hierarchy.

15. The computer-readable storage medium of claim 14, wherein the method further comprises:

receiving a request from the database administrator to perform an operation on a target domain within the database system;

determining whether the database administrator is authorized to modify the target domain;

if the database administrator is authorized to modify the target domain, performing the operation by modifying an entry for the target domain within a domain table in the database system that includes an entry for each domain defined within the database system.

16. The computer-readable storage medium of claim 15, wherein the operation on the target domain includes one of:

creating the domain within the database system;

moving the domain to be under a different parent domain within the database system;

dropping the domain from the database system; and renaming the domain.

17. The computer-readable storage medium of claim 15, wherein each entry in the domain table includes:

a domain identifier; and an identifier for a parent domain.

18. The computer-readable storage medium of claim 10, wherein identifying the domain that the user identifier is associated with involves:

looking up an identifier for the domain in the entry for the user identifier in the user table, if the entry exists; and if the entry does not exist, receiving the identifier for the domain as part of the request to perform the operation.

19. An apparatus for facilitating compartmentalized user management in a database system, the apparatus comprising:

the database system that is compartmentalized into a plurality of domains that are insulated from each other, so that a given user that has access to data within an associated domain does not have access to data in other domains;

a receiving mechanism that is configured to receive a request from a database administrator to perform an operation on a user identifier within the database system;

an identification mechanism that is configured to identify a domain that the user identifier is associated with in the database system;

a determination mechanism that is configured to determine whether the database administrator is authorized to modify user identifiers associated with the domain;

a user table that includes an entry for each user identifier defined within the database system; and a request processing mechanism tat is configured to perform the operation by modifying an entry for the user identifier within the user table, if the database administrator is authorized to modify the user identifiers associated with the domain.

20. The apparatus of claim 19, wherein the operation on the user identifier includes one of:

creating the user identifier within the database system, changing the domain that the user identifier is associated with in the database system;

dropping the user identifier from the database system;

renaming the user identifier; and changing any other properties attached to the user identifier.

21. The apparatus of claim 19, wherein if the database administrator is not authorized to modify user identifiers associated with the domain, the request processing mechanism is configured to disallow the operation.

22. The apparatus of claim 19, wherein the plurality of domains in the database system are organized into a hierarchy in which each domain can have multiple direct descendents and at most one direct ancestor;

wherein each database administrator for the database system is associated with a given domain in the hierarchy and is authorized to modify user identifiers associated with the given domain, as well as user identifiers associated with domains that are descendents of the given domain.

23. The apparatus of claim 22, wherein each database administrator for the database system is authorized to modify the database administrator's associated given domain, as well as domains that are descendents of the given domain within the hierarchy.

24. The apparatus of claim 23, further comprising a domain table that includes an entry for each domain defined within the database system;

wherein the receiving mechanism is additionally configured to receive a request from the database administrator to perform an operation on a target domain within the database system;

wherein the determination mechanism is additionally configured to determine whether the database administrator is authorized to modify the target domain;

wherein the request processing mechanism is additionally configured to perform the operation by modifying an entry for the target domain within the domain table in the database system if the database administrator is authorized to modify the target domain.

25. The apparatus of claim 24, wherein the operation on the target domain includes one of.

creating the domain within the database system;
moving the domain to be under a different parent domain within the database system;
dropping the domain from the database system; and
renaming the domain.

26. The apparatus of claim 24, wherein each entry in the domain table includes:
a domain identifier; and
an identifier for a parent domain.

27. The apparatus of claim 19, wherein the identification mechanism is configured to:
look up an identifier for the domain in the entry for the user identifier in the user table, if the entry exists; and
if the entry does not exist, to receive the identifier for the domain as part of the request to perform the operation.

* * * * *